(12) United States Patent
Benty et al.

(10) Patent No.: US 7,722,763 B2
(45) Date of Patent: May 25, 2010

(54) PURIFICATION AND SEPARATION SYSTEM FOR A FLUID FLOW STREAM

(76) Inventors: Jeffrey Benty, 11230 Sunrise La., East Aurora, NY (US) 14056; Mike Kistner, 539 Pine St., Lockport, NY (US) 14094; Ken Kistner, 6 Randwood Dr., Getzville, NY (US) 14068; Paul Rowe, 55 Valleybrook Dr., Fairport, NY (US) 14450; Paul McCarthy, 115 Grandview Ter., Batavia, NY (US) 14020

( * ) Notice: Subject to any disclaimer, the term of this patent is extended or adjusted under 35 U.S.C. 154(b) by 8 days.

(21) Appl. No.: 12/109,115

(22) Filed: Apr. 24, 2008

(65) Prior Publication Data

US 2008/0283475 A1 Nov. 20, 2008

Related U.S. Application Data

(60) Provisional application No. 60/913,595, filed on Apr. 24, 2007.

(51) Int. Cl.
*E03F 5/14* (2006.01)
(52) U.S. Cl. ............... 210/162; 210/170.03; 210/305; 210/532.1; 210/538
(58) Field of Classification Search ............... 210/747, 210/800, 803, 804, 162, 170.03, 299, 305, 210/307, 459, 497.01, 498, 499, 521, 532.1, 210/538
See application file for complete search history.

(56) References Cited

U.S. PATENT DOCUMENTS

| | | | | | |
|---|---|---|---|---|---|
| 623,731 | A | * | 4/1899 | Nicholas | 210/305 |
| 974,717 | A | * | 11/1910 | Sphaler | 210/305 |
| 2,216,300 | A | * | 10/1940 | Shenk | 210/307 |
| 3,730,881 | A | | 5/1973 | Armstrong | |
| 4,400,274 | A | * | 8/1983 | Protos | 210/305 |
| 4,517,091 | A | | 5/1985 | Yamanaka et al. | |
| 5,360,555 | A | * | 11/1994 | Batten | 210/803 |
| 5,433,845 | A | * | 7/1995 | Greene et al. | 210/170.03 |
| 5,620,594 | A | | 4/1997 | Smith et al. | |
| 6,077,448 | A | * | 6/2000 | Tran-Quoc-Nam et al. | 210/532.1 |
| 6,183,633 | B1 | | 2/2001 | Phillips | |
| 6,200,484 | B1 | * | 3/2001 | McInnis | 210/170.03 |
| 6,214,217 | B1 | * | 4/2001 | Sliger, Jr. | 210/459 |
| 6,749,746 | B2 | * | 6/2004 | Mokrzycki | 210/170.03 |
| 7,001,527 | B2 | | 2/2006 | Stever et al. | |
| 7,011,743 | B2 | | 3/2006 | Use et al. | |
| 7,138,048 | B1 | | 11/2006 | O'Connor et al. | |
| 7,276,156 | B2 | * | 10/2007 | Lockerman et al. | 210/162 |
| 7,294,256 | B2 | * | 11/2007 | Happel et al. | 210/162 |
| 7,297,266 | B2 | | 11/2007 | Cobb et al. | |
| 2005/0006320 | A1 | | 1/2005 | Use et al. | |

* cited by examiner

*Primary Examiner*—Christopher Upton
(74) *Attorney, Agent, or Firm*—Eckert Seamans Cherin & Mellott, LLC; Carol A. Marmo, Esq.

(57) ABSTRACT

The present invention relates generally to purification and separation of a fluid flow stream, and more particularly, to a separation system including a device for dispersing the fluid flow and separating pollutants there from. The device includes a vertical screen and baffle wall positioned in a fluid flow stream between the inlet and outlet openings of a chamber. The chamber can include a sump for collecting and storing sediment that is separated from the fluid. The present invention also relates to a method of purifying and separating a fluid flow stream.

8 Claims, 2 Drawing Sheets

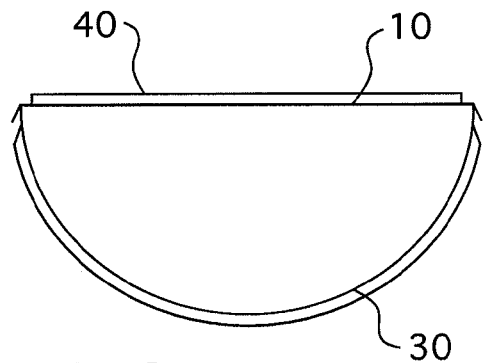
FIG. 2
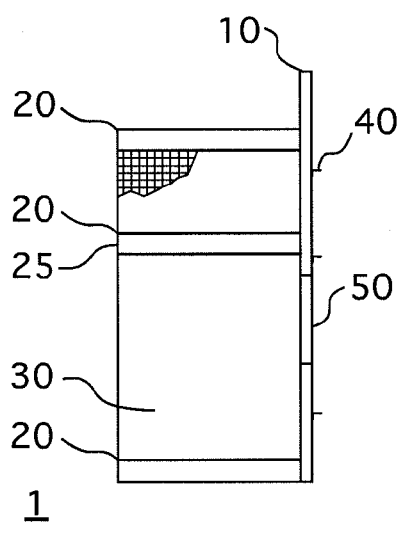
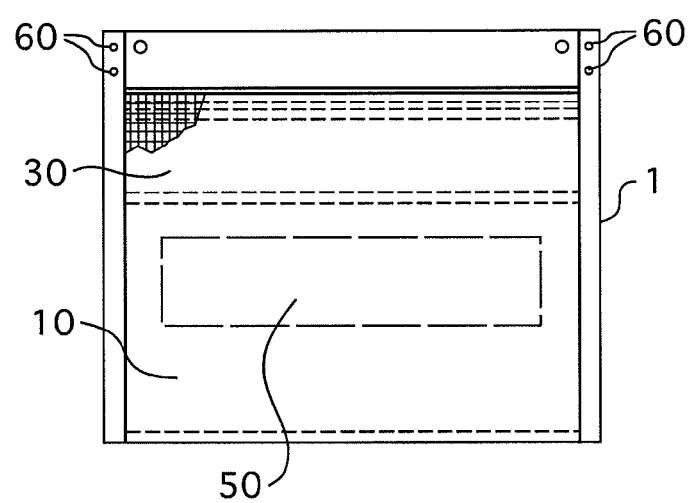
FIG. 5　　FIG. 4

PURIFICATION AND SEPARATION SYSTEM FOR A FLUID FLOW STREAM

This application claims the benefit of U.S. Provisional Application No. 60/913,595, entitled "PURIFICATION AND SEPARATION SYSTEM FOR A FLUID FLOW STREAM," which was filed on Apr. 24, 2007, the disclosure of which is incorporated herein by reference.

BACKGROUND OF THE INVENTION

1. Field of the Invention

The present invention relates generally to purification and separation of a fluid flow stream, and more particularly, to a separation system including a device for dispersing the fluid flow and separating pollutants there from. The present invention also relates to a method of purifying and separating a fluid flow stream.

2. Background Information

It is often desirable to purify and separate fluid flows for use in fluid transfer systems such as water drainage systems. The process of purification and separation includes removing pollutants, debris and various solid particulates from the fluid. For example, during rainstorms, water that is not absorbed into the ground can come into contact with roadways, parking lots, landscaped areas and other surfaces. As the water flows across these surfaces, it can pick up debris and pollutants and carry them into a storm-water run-off system. The water exiting the storm-water run-off system can then be directed to natural water bodies. If a means for purifying and separating the storm-water is not provided, the pollutants and particulates contained therein may be carried to the natural water bodies causing them to be polluted or contaminated.

There may also be local, state and federal laws and rules requiring municipalities, businesses and, in some instances, private entities, to establish a means to reduce particulate and contaminant levels permissibly transferred to natural bodies of water from property under their control. To maintain freshwater systems, some cities and counties have regulations requiring that some of the pollutants be removed from the storm-water before entering their storm sewer systems. In order to meet these regulations, facilities typically install on-site pollution traps to filter the storm-water.

The removal of debris and pollutants from a fluid flow stream is usually accomplished by means of traps which attempt to trap particles from the fluid by the use of meshes, grates or the like. These components have a tendency to clog up thereby reducing their effectiveness. Further, separation devices and systems known in the art may be expensive and difficult to maintain. Thus, it is desirable for a separation device or system to minimize clogging to improve effectiveness, to not be prohibitively expensive, and to allow easy access for maintenance Thus, there is room for improvement relative to devices or systems for use in purifying and separating fluid flows.

SUMMARY OF THE INVENTION

These needs and others are satisfied by present invention which is directed to a system for purifying and separating a fluid.

As one aspect of the invention, a device for separating pollutants from a fluid, comprising:

a chamber having side walls, a bottom, an inlet for receiving fluid, and an outlet for transferring fluid out of the chamber;

a vertical screen positioned within the chamber between the inlet and the outlet and perpendicular to the fluid flowing from the inlet, the screen comprising a plurality of apertures to disperse the fluid from the inlet; and a vertical baffle wall positioned within the chamber between the inlet and the outlet and perpendicular to the fluid flowing from the inlet, the baffle wall comprising at least one aperture.

As another aspect of the invention, a method for purification and separation of a fluid from pollutants contained therein, the method comprising:

inputting the fluid into a chamber through an inlet opening;

dispersing the fluid by contact with a vertical screen such that pollutants settle to the bottom of the chamber;

passing the fluid through at least one aperture located within a vertical baffle wall positioned downstream of the vertical screen; and outputting the fluid from the chamber through an outlet opening.

As another aspect of the invention, a device for separating pollutants from a fluid, comprising:

a vertical screen adapted to be positioned within a chamber between an inlet and an outlet and perpendicular to the fluid flowing from the inlet, the screen comprising a plurality of apertures to disperse the fluid from the inlet; and a vertical baffle wall adapted to be positioned within the chamber between the inlet and the outlet and perpendicular to the fluid flowing from the inlet, the baffle wall comprising at least one aperture.

In other aspects of the invention, the baffle wall is positioned such that the liquid has a residence time in the chamber that is sufficient for the pollutants to settle out of the liquid and/or the aperture within the baffle wall is located a vertical distance below the outlet of the chamber.

BRIEF DESCRIPTION OF THE DRAWINGS

A full understanding of the invention can be gained from the following description of the preferred embodiments when read in conjunction with the accompanying drawings in which:

FIG. 2 shows a top view of a curved vertical screen, a vertical baffle wall and horizontal vanes in accordance with the present invention.

FIG. 4 shows a front view of a vertical screen, a vertical baffle wall and horizontal vanes in accordance with the present invention.

FIG. 5 shows a side view of a vertical screen, a vertical baffle wall and horizontal vanes in accordance with the present invention.

DETAILED DESCRIPTION OF THE INVENTION

Figure 1:
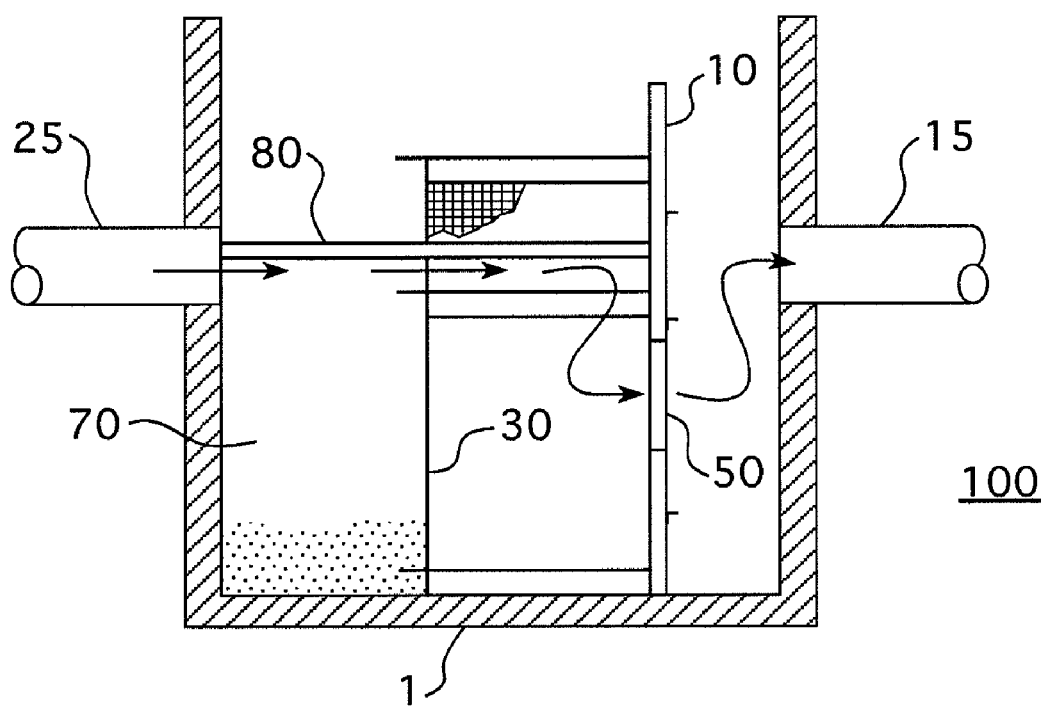
FIG. 1 shows a schematic of a fluid flow pattern through a chamber containing a separation device in accordance with the present invention.

The present invention is related to an apparatus and method for separating pollutants such as debris (e.g., vegetative matter, plastic, and paper), particulate matter (e.g., sand, grit, and clay), and/or floating matter (e.g., motor oil, other hydrocarbons, and detergents), from a fluid flow stream. Generally, the apparatus includes a chamber having an inlet for receiving a polluted fluid and an outlet for the separated fluid to flow out, and a sump or bottom for collecting and storing sediment (e.g., debris, particulate and/or floating matter separated from the liquid). Within the chamber can be one or more screens and baffles forming gap(s) and having apertures. A gap defines a longer liquid flow route through the chamber and the apertures disperse the liquid within the chamber, thereby increasing the residence time of the liquid within the chamber which encourages settling of particulate matter such as pollutants.

Directional phrases used herein, such as, for example, upper, lower, top, bottom, left, right, and derivatives thereof, relate to the orientation of the elements shown in the drawings and are not limiting upon the claims unless expressly recited therein.

As employed herein, the statement that two or more parts are "connected" together shall mean that the parts are joined together either directly or joined through one or more intermediate parts.

As employed herein, the term "number" shall refer to one and more than one (i.e., a plurality).

As shown in FIG. 1, in an embodiment of the present invention, a separation system 100 includes a chamber 1 having an inlet 25 to receive fluid flow and an outlet 15 to transfer fluid out of the chamber 1. The chamber 1 can be made of concrete or can be alternatively fabricated in whole or in part of metal, plastic, fiberglass or other suitable materials. The inlet 25 can be a pipe used to connect the chamber to an upstream fluid source or transfer system. The outlet 15 can be a pipe used to connect the chamber to a downstream fluid transfer system. For example, the upstream fluid transfer system may include a drainage or stormwater system from a roadway or the like. The downstream fluid transfer system can include a municipal water treatment plant of natural or artificial body of water. The fluid flow entering the chamber 1 through the inlet 25 may contain floating debris and oils 80. Within chamber 1 is vertical screen 30 and vertical baffle wall 10 positioned between the inlet 25 and the outlet 15. The screen 30 and baffle wall 10 are positioned perpendicular to the fluid flow stream through the chamber 1. The vertical screen 30 is positioned upstream of the vertical baffle wall 10 in relation to the fluid flow stream. The screen 30 and baffle wall 10 can extend vertically upward and downward from the invert of the inlet 25 into the upper portion and lower portion of the chamber. The screen 30 and baffle wall 10 can extend downward to the bottom of the chamber or nearly the bottom of the chamber. The screen 30 and baffle wall 10 can extend upward to above the fluid surface elevation. In an embodiment, the baffle wall 10 can extend upward beyond the screen 30. Further, the baffle wall 10 can extend upward beyond the screen 30 by at least about 12 inches. Moreover, the baffle wall can extend upward to at least about six (6) inches above the fluid surface elevation. The screen 30 and baffle wall 10 are located within chamber 1 as sectional walls or inserts that are removable from the chamber 1. Further, the screen 30 and baffle wall 10 can be attachable to an interior side of the chamber side walls. The lower portion of the chamber 1, e.g., from the invert of the inlet 25 to the top surface of the floor, is referred to as the sump 70. The sump 70 is provided to collect and store sediment, e.g., debris, particulate and/or floating matter that is separated from the fluid. The depth of the sump 70 may vary and can be sized in accordance with the amount of sediment to be collected and stored. The liquid flow impinges the screen 30. To enhance particle settling efficiencies, the screen 30 reduces or prevents short circuit flow from inlet to outlet by dispersing a substantially uniform flow across essentially the entire surface area of the chamber. Thus, the screen 30 provides a more uniform slower fluid flow to enhance natural settling of pollutants from the fluid due to gravity. The floating debris and oil is separated from the liquid and collected in sump 70. The baffle wall 10 is configured to prevent particulate or floating matter from exiting the sump 70 and the area located between the screen 30 and the baffle wall 10. The bottom of the chamber 1 or the sump 70 can be cleaned and the sediment removed on periodic basis. The frequency of cleaning and removal will be dependent on the amount of sediment deposited therein. The baffle wall 10 includes at least one aperture 50. The aperture is typically sized to control the fluid flow passing from the inlet 25 to the outlet 15. The size of the aperture 50 can depend on the velocity of the fluid flow. In an embodiment, the aperture can be sized to minimize or essentially prevent any restriction of the flow. In an alternate embodiment, the aperture can be sized to restrict flow and allow for increased settling of pollutants from the fluid. The at least one aperture 50 is located vertically below the outlet 15 of chamber 1 such that the fluid flows through the aperture 50 and upwardly to flow through the outlet 15.

As shown in FIG. 2, the vertical screen 30 is curved having a cylindrical shape on the frontal face. The convex portion of the curvature is disposed on the inlet side of the chamber. In an embodiment, the curvature is such that the diameter of the curve is from 0.5 to 0.7 times the width of the chamber. The screen 30 contains a plurality of apertures (not shown) which encourages separating and settling of pollutants from the fluid. The number and size of the apertures can vary. The apertures can be such to make the screen 30 substantially porous. The apertures being sized to reduce the amount of pollutants contained within the fluid that can pass through the openings. The screen 30 can be constructed using a variety of materials and typically is constructed of a fairly rigid material that can be submerged in water for extended periods of time without substantially degrading, e.g., a rust-resistant material. Suitable materials can include but are not limited to aluminum, steel (e.g., stainless steel), brass, iron, fiberglass, plastic and the like. The vertical screen 30 and the vertical baffle wall 10 are connected to form a structure having a hemispherical shape with a radius R. Connection of the screen 30 and wall 10 can be accomplished using conventional fastening means known in the art such as bolts, rivets or welding. The baffle wall 10 can be constructed using a variety of materials and typically is constructed of a fairly rigid material that can be submerged in water for extended periods of time without substantially degrading, e.g., a rust-resistant material. Suitable materials for the baffle wall can include those described above for the screen. Angle 40 is positioned on the exterior surface of baffle wall 10.

Figure 3:
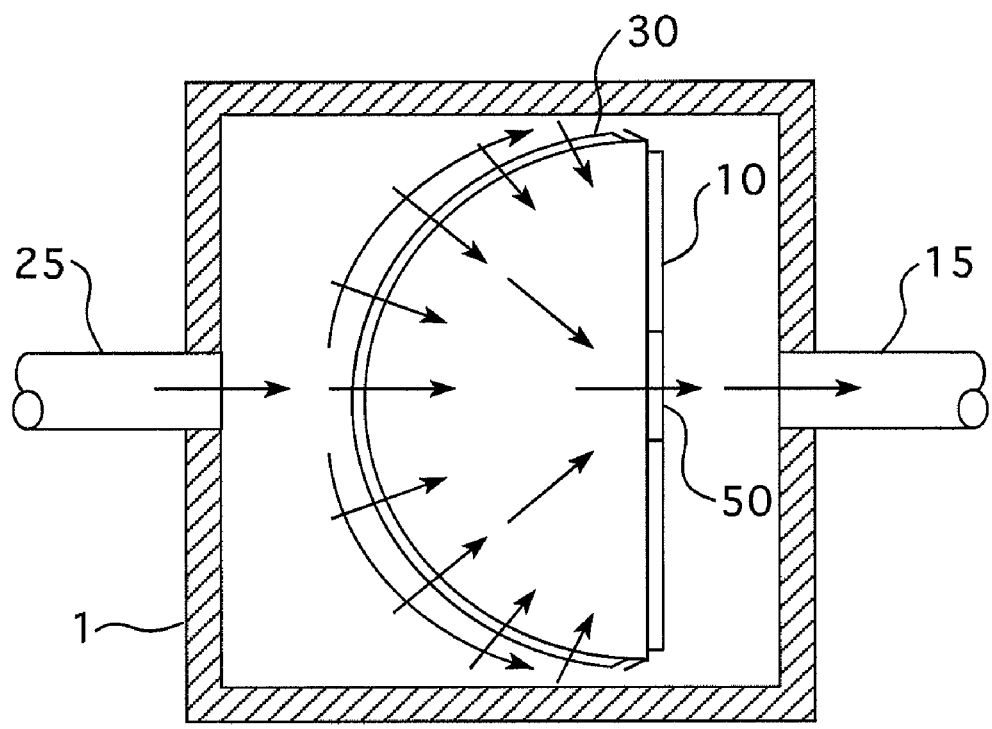
FIG. 3 shows a schematic of a fluid flow pattern through an inlet, a curved vertical screen, a vertical baffle wall and an outlet in accordance with the present invention.

As shown in FIG. 3, the fluid flows through an inlet 25 and enters the chamber 1. In the chamber 1, the fluid flow impinges upon the curvature of the vertical screen 30. The curved shape of the screen 30 and the apertures (not shown) within the screen 30 encourage dispersion of the fluid flow; thus, reducing the velocity of the inlet fluid flow. The inlet fluid flow is deflected to the sides of the chamber 1 and through the apertures of the screen 30. A scour (not shown) is created on the exterior surface of the screen 30 causing collected floating debris to be carried to the sides of the chamber 1, thereby reducing any mixing. Since the debris collecting on the exterior surface of the screen 30 is carried away, such can be referred to as a self-cleaning screen. Pollutants that cannot pass through the apertures because the size of the pollutants exceed the size of the apertures, are separated from the liquid and settle to the floor of the chamber 1. It is believed that as a result of the fluid flow being dispersed, the velocity of the fluid flow being deflected down into the floor of the chamber 1 is decreased, thereby reducing turbulence of the fluid and the potential for re-entrainment into the liquid of pollutants that settle in the sump 70 or on the floor of the chamber 1.

At least a portion of the fluid flow then continues through the aperture(s) 50 in the baffle wall 10 to the outlet 15 of the chamber 1. The baffle wall 10 also allows pollutants which settle out of the fluid to be retained on the inlet side of the chamber 1. The baffle wall 10 is positioned within the chamber 1 relative to the screen 30 such that the residence time of the fluid is sufficient to encourage the pollutants to settle to the bottom of the chamber. As shown in FIG. 4, the baffle wall 10 can also be connected to the interior wall(s) of the chamber 1 through anchor holes 60. Connecting the baffle wall 10 to the screen 30 and chamber walls can be carried out using conventional fastening means such as bolts, rivets, welding or the like. In an embodiment, the baffle wall 10 has anchor holes 60 located on the vertical sides to attach it to the inside walls of the chamber 1 using concrete fastening devices.

In an embodiment of the present invention, as shown in FIG. 5, one or more horizontal vanes 20 can be positioned on the exterior surface of the vertical screen 30, on the inlet side of the chamber 1. A vane 20 can be located at the top of the screen 30, at the invert of the inlet 25 inside the chamber and at the bottom of the screen 30. The vane 20 can be structured to conform to the curvature of the screen. Thus, the vane 20 can be curved or angled. The vane(s) 20 serve to reduce the velocity of the fluid flow from the inlet 25 such that the flow is not directed into the bottom of the chamber 1 and encourages the flow to the sides of the chamber 1. The vane 20 can be constructed using a variety of materials and typically is constructed of a fairly rigid material that can be submerged in water for extended periods of time without substantially degrading, e.g., a rust-resistant material. Suitable materials for the vane can include those described above for the screen and baffle.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A device for separating pollutants from a fluid, comprising:
   a chamber having side walls, a bottom, an inlet for receiving fluid, and an outlet for transferring fluid out of the chamber;
   a curved vertical screen positioned within the chamber between the inlet and the outlet and perpendicular to the fluid flowing from the inlet, the screen comprising a plurality of apertures to disperse the fluid from the inlet, the apertures being sized to reduce the flow of pollutants there through;
   a vertical baffle wall positioned within the chamber between the inlet and the outlet and perpendicular to the fluid flowing from the inlet, the baffle wall being at least partially connected to the screen, the baffle wall comprising at least one aperture; and
   one or more horizontal vanes positioned on an exterior surface of the vertical screen.

2. The device of claim 1 wherein the screen is fabricated of perforated material.

3. The device of claim 2 wherein the material is selected from the group consisting of aluminum and stainless steel.

4. The device of claim 1 wherein the screen is at least substantially porous.

5. The device of claim 1 wherein the baffle wall is positioned such that the fluid has a residence time in the chamber that is sufficient for the pollutants to settle out of the fluid.

6. The device of claim 1 wherein the aperture within the baffle wall is located a vertical distance below the outlet of the chamber.

7. The device of claim 1 wherein the vanes are positioned to at least substantially reduce re-entrainment of the pollutants into the fluid.

8. The device of claim 1 further comprising a sump positioned in the bottom of the chamber for collecting and storing sediments.

\* \* \* \* \*

UNITED STATES PATENT AND TRADEMARK OFFICE
CERTIFICATE OF CORRECTION

| | | |
|---|---|---|
| PATENT NO. | : 7,722,763 B2 | Page 1 of 1 |
| APPLICATION NO. | : 12/109115 | |
| DATED | : May 25, 2010 | |
| INVENTOR(S) | : Jeffrey Benty | |

It is certified that error appears in the above-identified patent and that said Letters Patent is hereby corrected as shown below:

On the Title page, Item (76) Inventors, please add --Dino Pezzimenti, 88 Parkway Drive, North Chili, NY (US) 14514.

Column 1, line 53, "maintenance Thus" should read --maintenance. Thus--.
Column 1, line 60, "by present invention" should read --by the present invention--.
Column 2, line 1, "vertical screen" should read --a vertical screen--.
Column 3, line 33, "plant of" should read --plant or--.
Column 4, line 7, "on periodic" should read --on a periodic--.

Signed and Sealed this

Twenty-third Day of November, 2010

David J. Kappos
*Director of the United States Patent and Trademark Office*